United States Patent [19]

Noonan

[11] 4,412,664

[45] Nov. 1, 1983

[54] FAMILY OF AIRFOIL SHAPES FOR ROTATING BLADES

[75] Inventor: Kevin W. Noonan, Hampton, Va.

[73] Assignee: The United States of America as represented by the Administrator of the National Aeronautics and Space Administration, Washington, D.C.

[21] Appl. No.: 392,096

[22] Filed: Jun. 25, 1982

[51] Int. Cl.³ .............................................. B64C 3/14
[52] U.S. Cl. .............................. 244/35 R; 244/35 A; 416/223 R; 416/242
[58] Field of Search .......................... 244/35 R, 35 A; 416/223 R, 242

[56] References Cited

U.S. PATENT DOCUMENTS 934,771  9/1909  Turnbull ............................ 244/35 R
4,325,675  4/1982  Gallot et al. ..................... 416/223 R

FOREIGN PATENT DOCUMENTS 1079083  11/1954  France ................................. 416/242
452366  8/1936  United Kingdom ............. 244/35 R

*Primary Examiner*—Trygve M. Blix
*Assistant Examiner*—Rodney Corl
*Attorney, Agent, or Firm*—Howard J. Osborn; John R. Manning; Wallace J. Nelson

[57] ABSTRACT

This invention is an airfoil which has particular application to the blade or blades of rotor aircraft such as helicopters and aircraft propellers. The airfoil thickness distribution and camber are shaped to maintain a near zero pitching moment coefficient over a wide range of lift coefficients and provide a zero pitching moment coefficient at section Mach numbers near 0.80 and to increase the drag divergence Mach number resulting in superior aircraft performance.

2 Claims, 8 Drawing Figures 4,412,664

FAMILY OF AIRFOIL SHAPES FOR ROTATING BLADES

ORIGIN OF THE INVENTION

The invention described herein was made by an employee of the Department of the Army and may be manufactured and used by or for the United States Government for governmental purposes without the payment of any royalties thereon or therefor.

BACKGROUND OF THE INVENTION

This invention relates to an airfoil design for rotating airfoils which has particular application to the blades of a rotor type aircraft (i.e., a helicopter) and aircraft propellers.

Typically, the helicopter forward flight velocity is limited by the increase in airfoil section drag and/or pitching moment that results from the section operational Mach number and lift coefficient. The airfoil section requirements for a helicopter rotor are more complex than those for a fixed wing aircraft. A single design lift coefficient does not exist, because, on a single revolution of the rotor, the airfoil experiences lift coefficients from negative values to maximum lift, and section Mach numbers from low subsonic to transonic value. Thus, the actual operating lift coefficients and Mach numbers for a rotor depend on the specific helicopter design and flight conditions.

In designing airfoil sections for rotor aircraft, the drag divergence Mach number for the airfoil section employed by the aircraft is of considerable importance. Not only do the power requirements increase rapidly when drag divergence is exceeded, but for most airfoils, the section pitching moment will increase substantially at a section Mach number slightly greater than that for drag divergence to result in increases in non-steady blade loads. In many instances over one-third of the rotor disc area operates at Mach numbers above drag divergence.

Prior art airfoil sections are designed to provide low drag and pitching moment; however, drag and pitching moment increases are normally encountered as flight velocity is increased resulting in a poor drag divergent profile. Generally, prior art airfoils encounter large increases in pitching moment coefficient near section Mach numbers of 0.80. A poor drag divergent profile is attributed to one or both of the following factors: (1) local supersonic flow extends behind the airfoil crest at a given lift coefficient to result in an aft facing suction force, and (2) the presence of local supersonic flow can result in shock waves which separate the boundary layer. Both of the above drag increases require additional power to overcome drag, and to propel the aircraft. Thus, drag divergence and pitching moment are particular problems when the aircraft rotor is operating in conditions for high speed flight.

Accordingly, it is an object of the invention to provide an airfoil section which has a near zero pitching moment coefficient about the aerodynamic center at higher section Mach numbers, and a zero pitching moment coefficient about the aerodynamic center at section Mach numbers near 0.80, and which will increase drag divergence to higher section Mach numbers over a broad range of lift coefficients.

Yet another object of the invention is to shape the airfoil sections by regulating the airfoil thickness distribution and camber in a manner to provide improved drag divergence characteristics and near zero pitching moment coefficients.

A further object of the invention is to provide a series or family of airfoils used in conjunction to improve the drag divergence and pitching moment characteristics of a rotor.

Another object of the invention is to provide improved blade stability, reduced blade twist, reduced blade fatigue and/or permit blade construction from a cheaper lighter material.

Still another object of the invention is to provide improved rotor performance to result in increased aircraft stability, increased fuel savings, decreased power requirements and/or permit increases in flight speed.

SUMMARY OF THE INVENTION

These and other objects of the invention are achieved by providing a rotor blade or propeller which has an airfoil section or sections of a particular shape. The airfoil which produces the desired result has an upper surface slope which gradually decreases from about the 2 percent chord location to about the 35 percent chord location where the value of the slope becomes zero. Behind the zero slope point, the slope of the upper surface is negative and it decreases (becomes more negative) continuously to a location of about 70 percent chord, aft of which the slope increases continuously to the trailing edge. Immediately aft of the leading edge, the lower slope is negative and it increases continuously to a location of about 44 percent chord. Rearward of the 44 percent chord location, the slope is positive and it increases continuously to a location of about 65 percent chord, aft of which the positive slope decreases continuously to about 75 percent chord. The positive slope increases continuously from about the 75 percent chord location to the airfoil trailing edge.

DETAILED DESCRIPTION OF THE INVENTION

Figure 1:
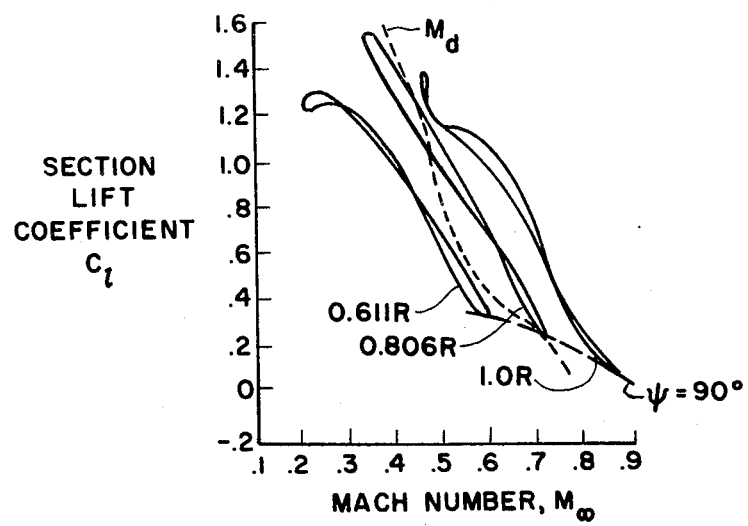
FIG. 1 is a plot of section lift coefficient against Mach number showing a representative envelope for a helicopter airfoil section operating at approximately 60 percent radius, 80 percent radius, and at the tip radius of the blade.

The interaction of the helicopter rotor blade with the freestream is rather complex as illustrated in FIG. 1. It is apparent from FIG. 1 that at a point of 0.611R, which represents the distance from the rotor hub or root out toward the tip of the blade, that the section profile is considerably different than at the positions 0.806R and at 1R which is the tip of the rotor blade. At the rotor blade tip, the airfoil section advancing into the wind operates at a Mach number near 0.9, at near zero lift coefficient whereas the retreating airfoil section operates at a Mach number of about 0.45 and a lift coefficient of 1.4. At the inboard position of 0.611R, the airfoil section is advancing into the freestream at a Mach number of approximately 0.6 and a lift coefficient of 0.3 and on the retreating side the Mach number is about 0.2 at a lift coefficient of about 1.3.

FIG. 1 shows the drag divergence Mach number $M_d$ of the rotor airfoil plotted on the curve. Drag divergence Mach number is defined as the airfoil section Mach number at which the rate of increase of drag coefficient with Mach number is 0.1. For most airfoils, the section pitching moment will increase substantially at a section Mach number slightly greater than for drag divergence. For the case of FIG. 1, beyond about 0.7R to 0.8R (which includes over one-third of the rotor disc area) the airfoil sections operate at a Mach number above drag divergence. The related increase in drag and the related increase in pitching moment has a prime influence on the power required to drive the rotor and the stability of the rotating blade. Therefore, an airfoil section or sections is desired which have a greater drag divergence Mach number over a wide range of lift coefficients and Mach numbers.

Figure 2:
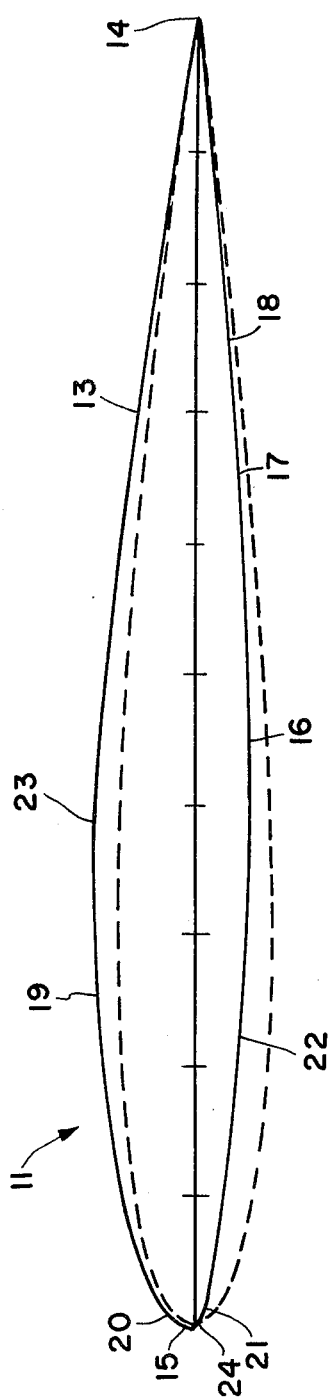
FIG. 2 shows a dotted profile of a prior art airfoil section superimposed on the invention airfoil section.

The airfoil section disclosed in FIG. 2 is designed to have the desired characteristics and is designated generally by the reference numeral 11. The airfoil section 11 has an upper surface 19 which is associated with a leading edge 15. From the point or position 20 at which the leading edge 20 fairs into the upper surface 19, the surface slope is positive and continuously decreasing back to approximately the 35% chord station 23. The zero slope position of the upper surface 23 may move slightly forward for airfoils with maximum thickness less than 10% chord. For example, the zero slope position for the 8% thick airfoil section is 34% chord. Behind the zero slope point 23 the slope of the upper surface is negative and it decreases continuously to a location of about 70% chord at station 13, aft of which the slope increases continuously to the trailing edge 14.

From the point 21 the lower surface leading edge 24 fairs into the lower surface 22, the lower surface slope is negative and increases continuously to a location of about 44% chord at station 16 where the slope becomes zero. The position of the zero slope point on the lower surface changes slightly with changes in the maximum thickness ratio of the airfoil. For example, the zero slope point moves from 43% chord for a 12% thick airfoil section to 46% chord for an 8% thick section. Rearward of the zero slope position 16, the lower surface slope is positive and increases continuously to about the 65% chord at station 17, aft of which the positive slope decreases continuously to about the 75% chord at station 18. The positive slope then increases continuously from the 75% chord location to the airfoil trailing edge 14.

In this embodiment, the trailing edge thickness is about 1.6% of the maximum thickness of the airfoil. For practical construction of the airfoil, the trailing edge thickness may be 1% to 3% of the maximum thickness of the airfoil.

FIG. 2 shows a dotted profile of a representative prior art airfoil section the NACA 0012. The prior art airfoil section is superimposed on airfoil section 11 to show the actual difference in the shape of the two airfoils.

Figure 3:
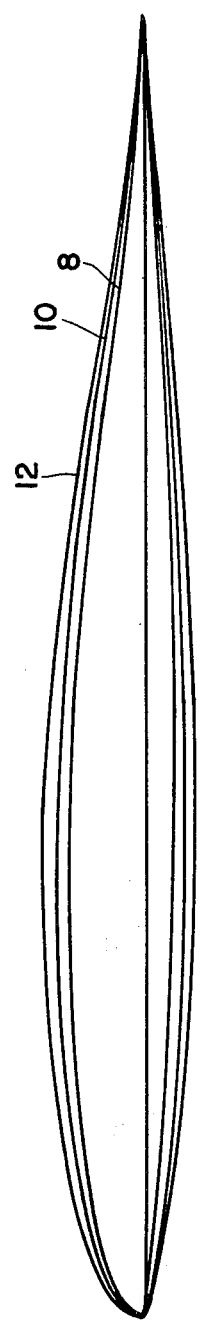
FIG. 3 shows a family of airfoils representative of section profiles.

FIG. 3 shows a representative family of airfoil profiles which might be utilized in construction of the total helicopter rotor blade. The intermediate profile 10 is a section which might be utilized in the intermediate area of the rotor blade, i.e., at an intermediate radial distance from the rotor hub. Airfoil section 8 is thinner and would normally be used near to and at the rotor blade tip. Airfoil section 12 is thicker and would be used in an area near or at the root of the rotor blade.

Figure 4:
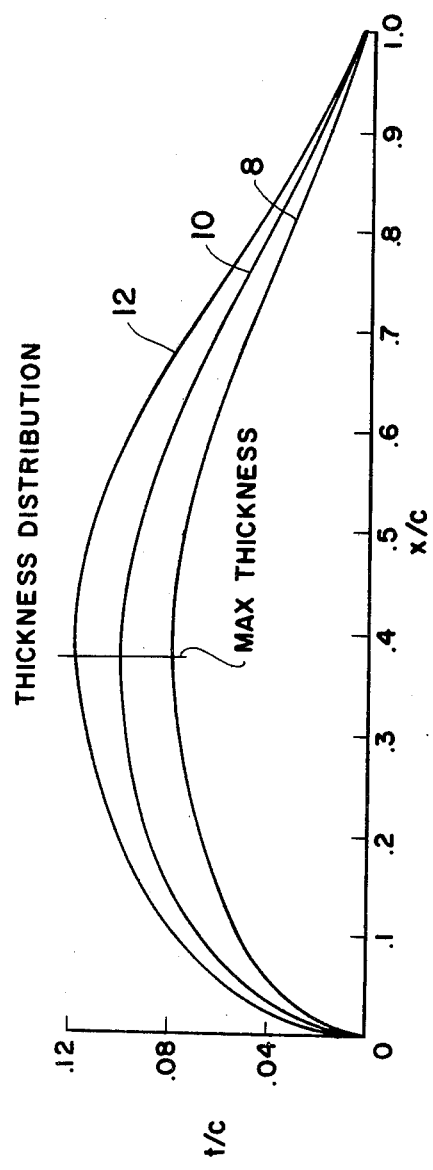
FIG. 4 is a plot of representative invention airfoil sections showing thickness distribution.

FIG. 4 is a plot of the thickness distribution of the airfoil sections 8, 10 and 12. The thickness-to-chord ratio t/c is plotted against the nondimensional distance from the leading edge of the airfoil along the chordline of the airfoil x/c. The values which define the thickness distribution curves of FIG. 4 are proportional to each other or scaled from each other at a given x/c. That is, the specific values of t/c for curve 8 are 80% of the t/c values for curve 10 because the maximum thickness of airfoil section 8, is 8% chord and that of airfoil section 10 is 10% chord. Similarly, the specific values of t/c for curve 12 are 120% of the t/c values for curve 10 because the maximum thickness of airfoil section 12 is 12% chord. An infinite number of thickness distribution curves may be formed in a similar manner.

Figure 5:
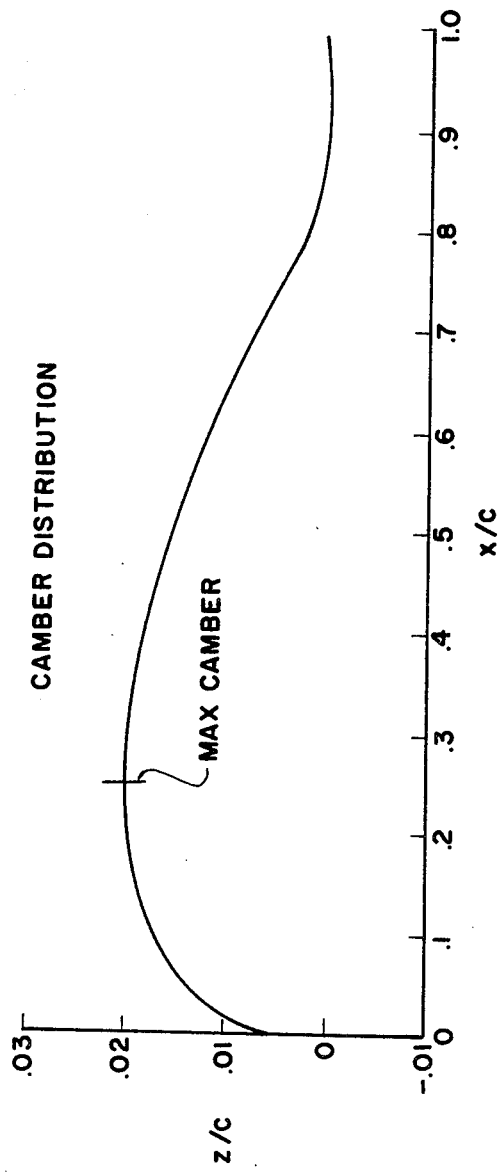
FIG. 5 is a plot of representative invention airfoil section showing camber distribution.

FIG. 5 is a plot of the camber line for the invention airfoil family, where the camber line defines the points of an airfoil section such that the upper and lower surfaces are equidistant. The nondimensional ordinate of the camber line z/c is plotted against the nondimensional distance from the leading edge of the airfoil along the chordline of the airfoil x/c.

A particular invention airfoil from the invention airfoil family may be defined by combining the camber line with the desired thickness distribution. Because of the difficulty involved in giving an adequate word description of the particular airfoil section being described, the coordinates for the invention airfoil sections 8, 10 and 12 are set forth respectively in Tables I, II and III. In particular, the ordinate of the upper surface $Y_u$ is determined by adding half of the thickness-to-chord ratio t/c to the nondimensional ordinate of the camber line z/c. Similarly, the ordinate of lower surface $Y_l$ is determined by subtracting half of the thickness-to-chord ratio from the nondimensional ordinate of the camber line z/c. FIGS. 4 and 5 and Tables I, II and III are thus representative of the shapes of the members of the airfoil family, which gives the desired pitching moment and drag divergence characteristics.

TABLE I

| UPPER SURFACE | | LOWER SURFACE | |
|---|---|---|---|
| $X_u/C$ | $Y_u$ | $X_l/C$ | $Y_l$ |
| 0.00000 | 0.00541 | 0.00000 | 0.00541 |
| 0.00082 | 0.00837 | 0.00418 | 0.00056 |
| 0.00338 | 0.01181 | 0.00662 | −0.00031 |
| 0.00977 | 0.01690 | 0.01523 | −0.00120 |
| 0.02331 | 0.02381 | 0.02669 | −0.00328 |
| 0.04812 | 0.03207 | 0.05188 | −0.00531 |
| 0.07363 | 0.03802 | 0.07637 | −0.00710 |
| 0.09873 | 0.04255 | 0.10127 | −0.00887 |
| 0.12387 | 0.04623 | 0.12612 | −0.01056 |
| 0.14907 | 0.04936 | 0.15092 | −0.01211 |
| 0.17430 | 0.05196 | 0.17569 | −0.01354 |
| 0.19961 | 0.05408 | 0.20038 | −0.01487 |
| 0.22487 | 0.05576 | 0.22512 | −0.01611 |

TABLE I-continued

| UPPER SURFACE | | LOWER SURFACE | |
|---|---|---|---|
| $X_{u}/C$ | $Y_u$ | $X_l/C$ | $Y_l$ |
| 0.25004 | 0.05703 | 0.24995 | −0.01728 |
| 0.30034 | 0.05856 | 0.29964 | −0.01931 |
| 0.35061 | 0.05890 | 0.34937 | −0.02089 |
| 0.37574 | 0.05865 | 0.37424 | −0.02149 |
| 0.40084 | 0.05813 | 0.39914 | −0.02195 |
| 0.42594 | 0.05731 | 0.42405 | −0.02226 |
| 0.45104 | 0.05620 | 0.44894 | −0.02240 |
| 0.47611 | 0.05478 | 0.47387 | −0.02236 |
| 0.50115 | 0.05308 | 0.49882 | −0.02215 |
| 0.52619 | 0.05111 | 0.52379 | −0.02177 |
| 0.55122 | 0.04890 | 0.54876 | −0.02125 |
| 0.57622 | 0.04647 | 0.57375 | −0.02060 |
| 0.60124 | 0.04381 | 0.59873 | −0.01985 |
| 0.62627 | 0.04094 | 0.62370 | −0.01905 |
| 0.65129 | 0.03788 | 0.64868 | −0.01822 |
| 0.67632 | 0.03466 | 0.67365 | −0.01742 |
| 0.70127 | 0.03133 | 0.69870 | −0.01669 |
| 0.72613 | 0.02796 | 0.72384 | −0.01604 |
| 0.75107 | 0.02464 | 0.74889 | −0.01542 |
| 0.77592 | 0.02145 | 0.77404 | −0.01477 |
| 0.80062 | 0.01847 | 0.79934 | −0.01396 |
| 0.82539 | 0.01569 | 0.82457 | −0.01290 |
| 0.85022 | 0.01311 | 0.84975 | −0.01156 |
| 0.87509 | 0.01071 | 0.87487 | −0.00998 |
| 0.90003 | 0.00849 | 0.89992 | −0.00824 |
| 0.92500 | 0.00646 | 0.92496 | −0.00643 |
| 0.94996 | 0.00462 | 0.94999 | −0.00456 |
| 0.97493 | 0.00299 | 0.97503 | −0.00249 |
| 1.00000 | 0.00164 | 1.00000 | 0.00036 |

TABLE II

| UPPER SURFACE | | LOWER SURFACE | |
|---|---|---|---|
| $X_{u}/C$ | $Y_u$ | $X_l/C$ | $Y_l$ |
| 0.00000 | 0.00000 | 0.00000 | 0.00000 |
| 0.00040 | 0.00883 | 0.00460 | −0.00042 |
| 0.00298 | 0.01346 | 0.00702 | −0.00164 |
| 0.00909 | 0.01926 | 0.01591 | −0.00438 |
| 0.02289 | 0.02733 | 0.02710 | −0.00652 |
| 0.04765 | 0.03671 | 0.05235 | −0.00994 |
| 0.07329 | 0.04361 | 0.07671 | −0.01268 |
| 0.09841 | 0.04892 | 0.10159 | −0.01524 |
| 0.12359 | 0.05332 | 0.12640 | −0.01758 |
| 0.14884 | 0.05703 | 0.15115 | −0.01970 |
| 0.17413 | 0.06014 | 0.17586 | −0.02163 |
| 0.19951 | 0.06269 | 0.20048 | −0.02337 |
| 0.22484 | 0.06473 | 0.22515 | −0.02498 |
| 0.25005 | 0.06630 | 0.24994 | −0.02645 |
| 0.30043 | 0.06827 | 0.29955 | −0.02895 |
| 0.35076 | 0.06884 | 0.34922 | −0.03079 |
| 0.37592 | 0.06864 | 0.37405 | −0.03145 |
| 0.40105 | 0.06810 | 0.39893 | −0.03190 |
| 0.42617 | 0.06723 | 0.42381 | −0.03214 |
| 0.45130 | 0.06599 | 0.44868 | −0.03214 |
| 0.47639 | 0.06439 | 0.47359 | −0.03191 |
| 0.50144 | 0.06245 | 0.49853 | −0.03145 |
| 0.52649 | 0.06019 | 0.52348 | −0.03078 |
| 0.55152 | 0.05764 | 0.54845 | −0.02991 |
| 0.57653 | 0.05482 | 0.57344 | −0.02888 |
| 0.60155 | 0.05174 | 0.59842 | −0.02772 |
| 0.62659 | 0.04842 | 0.62337 | −0.02646 |
| 0.65161 | 0.04487 | 0.64835 | −0.02515 |
| 0.67664 | 0.04114 | 0.67332 | −0.02385 |
| 0.70158 | 0.03730 | 0.69838 | −0.02262 |
| 0.72641 | 0.03344 | 0.72355 | −0.02146 |
| 0.75134 | 0.02962 | 0.74862 | −0.02036 |
| 0.77615 | 0.02595 | 0.77381 | −0.01923 |
| 0.80078 | 0.02251 | 0.79917 | −0.01794 |
| 0.82549 | 0.01925 | 0.82446 | −0.01641 |
| 0.85027 | 0.01618 | 0.84968 | −0.01460 |
| 0.87511 | 0.01329 | 0.87483 | −0.01253 |
| 0.90004 | 0.01058 | 0.89991 | −0.01031 |
| 0.92500 | 0.00806 | 0.92495 | −0.00802 |
| 0.94995 | 0.00576 | 0.94999 | −0.00569 |
| 0.97491 | 0.00367 | 0.97503 | −0.00315 |
| 1.00000 | 0.00179 | 1.00000 | 0.00020 |

TABLE III

| UPPER SURFACE | | LOWER SURFACE | |
|---|---|---|---|
| $X_{u}/C$ | $Y_u$ | $X_l/C$ | $Y_l$ |
| 0.00000 | 0.00801 | 0.00000 | 0.00801 |
| 0.00259 | 0.01552 | 0.00002 | 0.00742 |
| 0.00842 | 0.02186 | 0.00504 | −0.00093 |
| 0.02249 | 0.03097 | 0.00745 | −0.00255 |
| 0.04720 | 0.04134 | 0.01661 | −0.00653 |
| 0.07296 | 0.04921 | 0.02755 | −0.00960 |
| 0.09811 | 0.05534 | 0.05284 | −0.01454 |
| 0.12333 | 0.06046 | 0.07707 | −0.01825 |
| 0.14862 | 0.06477 | 0.10192 | −0.02160 |
| 0.17397 | 0.06839 | 0.12670 | −0.02460 |
| 0.19943 | 0.07137 | 0.15140 | −0.02731 |
| 0.22482 | 0.07377 | 0.17605 | −0.02975 |
| 0.25007 | 0.07565 | 0.20059 | −0.03194 |
| 0.30053 | 0.07806 | 0.22519 | −0.03392 |
| 0.35093 | 0.07888 | 0.24994 | −0.03570 |
| 0.37612 | 0.07872 | 0.29948 | −0.03866 |
| 0.40127 | 0.07818 | 0.34907 | −0.04076 |
| 0.42641 | 0.07724 | 0.37388 | −0.04146 |
| 0.45157 | 0.07588 | 0.39873 | −0.04191 |
| 0.47668 | 0.07410 | 0.42358 | −0.04210 |
| 0.50174 | 0.07192 | 0.44842 | −0.04199 |
| 0.52679 | 0.06937 | 0.47331 | −0.04158 |
| 0.55183 | 0.06647 | 0.49824 | −0.04088 |
| 0.57684 | 0.06327 | 0.52319 | −0.03990 |
| 0.60187 | 0.05976 | 0.54815 | −0.03869 |
| 0.62692 | 0.05597 | 0.57313 | −0.03728 |
| 0.65194 | 0.05194 | 0.59810 | −0.03569 |
| 0.67698 | 0.04771 | 0.62305 | −0.03397 |
| 0.70190 | 0.04336 | 0.64802 | −0.03218 |
| 0.72670 | 0.03901 | 0.67299 | −0.03039 |
| 0.75161 | 0.03469 | 0.69806 | −0.02864 |
| 0.77638 | 0.03054 | 0.72326 | −0.02698 |
| 0.80094 | 0.02661 | 0.74835 | −0.02539 |
| 0.82559 | 0.02287 | 0.77357 | −0.02377 |
| 0.85033 | 0.01930 | 0.79901 | −0.02201 |
| 0.87514 | 0.01591 | 0.82435 | −0.01999 |
| 0.90005 | 0.01269 | 0.84962 | −0.01769 |
| 0.92500 | 0.00969 | 0.87480 | −0.01512 |
| 0.94994 | 0.00692 | 0.89989 | −0.01240 |
| 0.97489 | 0.00437 | 0.92494 | −0.00963 |
| 1.00000 | 0.00195 | 0.94999 | −0.00684 |
|  |  | 0.97504 | −0.00385 |
|  |  | 1.00000 | 0.00005 |

OPERATION OF THE INVENTION

Figure 6:
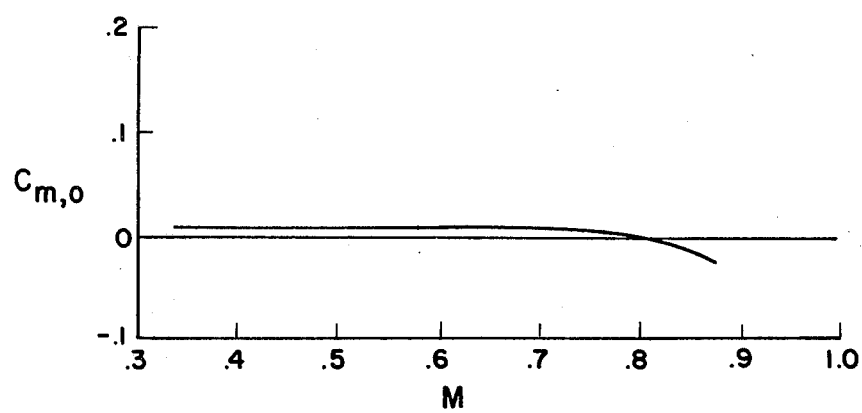
FIG. 6 is a plot of the pitching moment coefficient about the aerodynamic center against Mach number for the 10 percent thick member of the invention airfoil family.

From the above description of the structural arrangement of the airfoil sections, the operation of the invention should now become apparent. The airfoil sections are designed to have a zero pitching moment coefficient about the aerodynamic center for section Mach numbers close to 0.80 and to operate at higher freestream Mach numbers before encountering drag divergence for a range of lift coefficients from about −0.1 to 0.9. FIG. 6 shows the measured pitching moment coefficient about the aerodynamic center of airfoil section 10. The pitching moment coefficient is zero at a section Mach number of 0.80 and near zero over a wide range of Mach numbers. Such a pitching moment profile increases the blade stability at the desired operating speed of the aircraft, thereby increasing overall aircraft stability and providing safe operating conditions at high flight speeds. In addition, a near zero pitching moment coefficient prevents blade twist, thereby reducing structural fatigue in the blade and/or allowing construction from a lighter, cheaper material.

Figure 7:
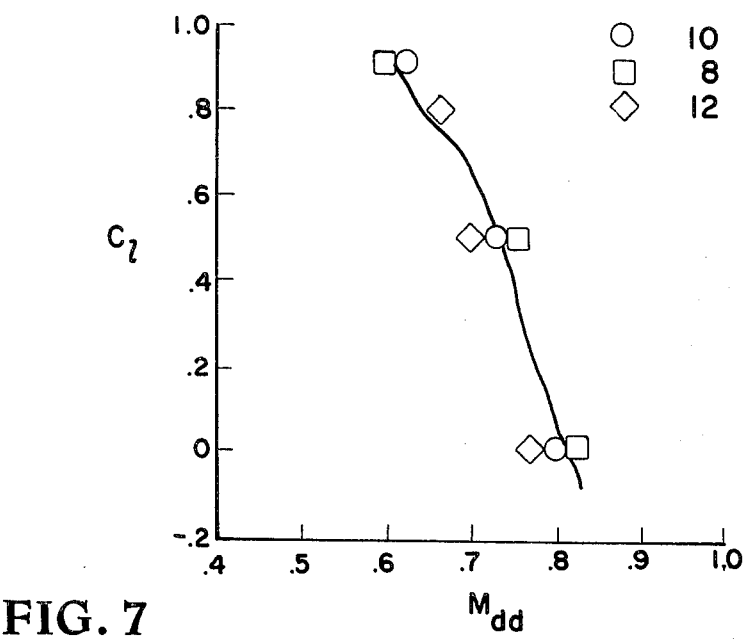
FIG. 7 is a plot of the lift coefficient against drag divergence Mach number for three different invention airfoil profiles.
Figure 8:
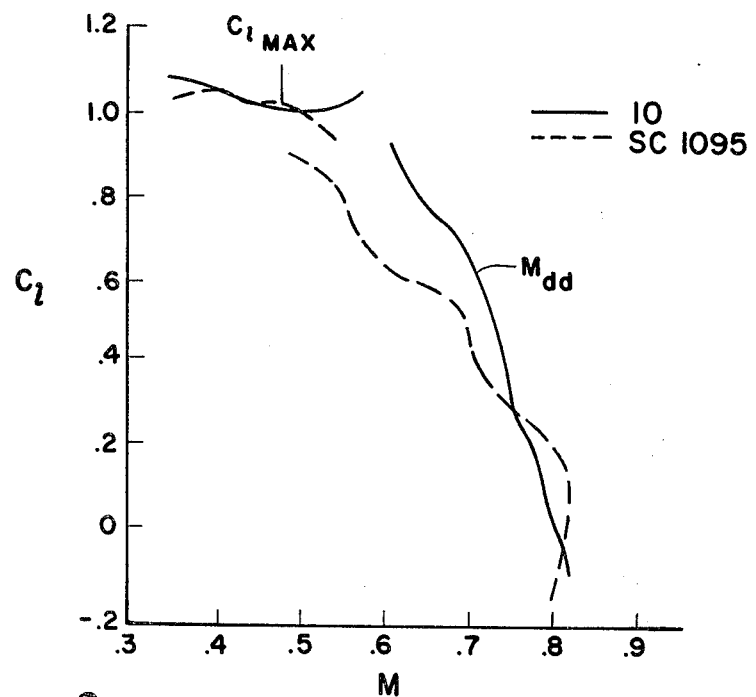
FIG. 8 is a plot of the lift coefficient against Mach number comparing the drag divergence of the invention airfoil section with a prior art 10 percent thick airfoil section.

In addition, the invention simultaneously achieves an improved drag divergence profile. FIG. 7 shows the actual drag divergence curve (solid line) of airfoil section 10 as determined by experimental measurements and the drag divergence Mach numbers predicted by theory at several lift coefficients for airfoil sections 8 and 12. FIG. 8 is a comparison of the drag divergence curves of the airfoil section 10 and a prior art airfoil section of about the same maximum thickness, the SC 1095 airfoil. The drag divergence curves for both airfoils have been determined from experimental measurements made in the same test facility. FIG. 8 indicates that the drag divergence Mach number of the invention airfoil 10 exceeds that of the SC 1095 at lift coefficients greater than 0.3 thus providing a significant improvement.

It is to be understood that the Mach number at which drag divergence occurs over the range of lift coefficients will vary notably with the camber and percent thickness airfoil, but is also affected by the particular helicopter with which the rotor blade is utilized. This statement is also applicable to the advantage gained in the form of increased performance and power which will vary depending on the type of helicopter with which the airfoil sections are utilized. Analyses have shown, however, that with a Bell Helicopter Company AH-1 aircraft, that movement of the drag divergent curve to a higher Mach number decreases the power required. Specifically, for this helicopter, an increase of 0.01 Mach number on the drag divergent plot at all lift coefficients resulted in 4% power savings for the aircraft. Thus, although the displacement of the drag divergent curve $M_{dd}$ in FIG. 8 is not of a great magnitude, it can be readily seen that a small displacement as explained above, results in a substantial improvement in the rotor aircraft performance. For example, in FIG. 8, at lift coefficients near 0.6, there is obviously very substantial improvement in aircraft performance. Furthermore, if the area between the prior art drag divergent curve and the invention drag divergent curve is converted to a power coefficient and integrated over the entire range of lift coefficients, it is readily apparent that the invention provides a decided improvement in power savings over the prior art.

It is to be understood that the forms of the invention shown are merely preferred embodiments and various changes can be made in the shape, size and the arrangement of the airfoil sections as will be readily apparent to those skilled in the art. Also, equivalent means may be substituted for those described and certain features may be used independently from other features described herein without departing from the spirit and scope of the invention.

What is claimed as new and desired to be secured by Letters Patent of the United States is:

1. An airfoil for a rotating blade such as a helicopter blade comprising:
   airfoil means;
   said airfoil means having upper surface means, lower surface means, a leading edge area, and a trailing edge;
   said upper surface means having a surface slope which is positive and continuously decreasing from the position where it fairs into said upper surface leading edge area to a position at approximately 35% chord, a surface slope from approximately 35% chord to approximately 70% chord which is negative and continuously decreasing, and from approximately 70% chord to said trailing edge has a slope which is negative and continuously increasing;
   said lower surface means having a slope from a position where it fairs into said lower surface leading edge to a position of approximately 44% chord which is negative and continuously increasing, a surface slope from approximately 44% chord to approximately 65% chord which is positive and continuously increasing, from approximately 65% chord to approximately 75% chord a surface slope which is positive and continuously decreasing, and a surface slope from approximately 75% chord to said trailing edge that is positive and continuously increasing;
   whereby the airfoil means pitching moment coefficient is minimized, a zero pitching moment coefficient at Mach numbers near 0.80 is maintained and the drag divergence Mach number is increased over a wide range of lift coefficients.

2. An airfoil for a rotating blade as in claim 1 wherein the thickness of said trailing edge is 1% to 3% of the total airfoil thickness.

* * * * *